United States Patent
Kim et al.

(10) Patent No.: US 9,166,226 B2
(45) Date of Patent: Oct. 20, 2015

(54) POSITIVE ELECTRODE FOR LITHIUM RECHARGEABLE BATTERY AND LITHIUM RECHARGEABLE BATTERY INCLUDING THE SAME

(75) Inventors: Daesik Kim, Yongin-si (KR); Maengeun Lee, Yongin-si (KR); Jiten Singh, Yongin-si (KR); Wonil Jung, Yongin-si (KR); Seonhye Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 593 days.

(21) Appl. No.: 13/549,592

(22) Filed: Jul. 16, 2012

(65) Prior Publication Data
US 2013/0171522 A1 Jul. 4, 2013

(30) Foreign Application Priority Data
Jan. 4, 2012 (KR) .................. 10-2012-0001186

(51) Int. Cl.
| | |
|---|---|
| *H01M 4/505* | (2010.01) |
| *H01M 4/52* | (2010.01) |
| *H01B 1/12* | (2006.01) |
| *H01M 4/525* | (2010.01) |
| *H01M 4/62* | (2006.01) |
| *H01M 10/052* | (2010.01) |
| *H01M 4/02* | (2006.01) |

(52) U.S. Cl.
CPC .............. *H01M 4/505* (2013.01); *H01B 1/122* (2013.01); *H01M 4/52* (2013.01); *H01M 4/62* (2013.01); *H01M 4/525* (2013.01); *H01M 4/621* (2013.01); *H01M 10/052* (2013.01); *H01M 2004/028* (2013.01); *Y02E 60/122* (2013.01)

(58) Field of Classification Search
CPC ....... H01M 4/505; H01M 4/52; H01M 4/525; H01M 4/621; H01M 4/62; H01M 10/052; H01M 2004/028; Y02E 60/122
See application file for complete search history.

(56) References Cited

U.S. PATENT DOCUMENTS

| | | | |
|---|---|---|---|
| 2003/0091905 A1 | 5/2003 | Nobuta et al. | |
| 2008/0131785 A1 | 6/2008 | Park et al. | |

FOREIGN PATENT DOCUMENTS

| | | |
|---|---|---|
| JP | 2011-076983 A | 4/2011 |
| KR | 10-2003-0032863 A | 4/2003 |
| KR | 10-0810634 B1 | 2/2008 |

*Primary Examiner* — Laura Weiner
(74) *Attorney, Agent, or Firm* — Lee & Morse, P.C.

(57) ABSTRACT

A positive electrode for a lithium rechargeable battery, the positive electrode including a positive electrode active material; a binder; and a positive electrode additive represented by the following Formula 1:

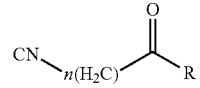

[Formula 1]

wherein R is a substituted or unsubstituted $C_1$ to $C_{10}$ alkyl group or a substituted or unsubstituted $C_5$ to $C_{30}$ aryl group and n is 0 or 1.

12 Claims, 2 Drawing Sheets

Cathode

R= alkyl or aryl group

POSITIVE ELECTRODE FOR LITHIUM RECHARGEABLE BATTERY AND LITHIUM RECHARGEABLE BATTERY INCLUDING THE SAME

1. FIELD

Embodiments relate to a positive electrode for a lithium rechargeable battery and a lithium rechargeable battery including the same.

2. DESCRIPTION OF THE RELATED ART

To cope with the changing industrial circumstances in pursuit of environmentally-friendly energy sources, new energy sources have been considered. In particular, research and development of a lithium rechargeable battery, which has high energy density and is capable of supplying power in a stable manner while demonstrating high performance, are being made to address the demand for a main power source or an auxiliary power source of an electric car or a hybrid car.

SUMMARY

Embodiments are directed to a positive electrode for a lithium rechargeable battery and a lithium rechargeable battery including the same.

The embodiments may be realized by providing a positive electrode for a lithium rechargeable battery, the positive electrode including a positive electrode active material; a binder; and a positive electrode additive represented by the following Formula 1:

[Formula 1]

wherein R is a substituted or unsubstituted $C_1$ to $C_{10}$ alkyl group or a substituted or unsubstituted $C_5$ to $C_{30}$ aryl group and n is 0 or 1.

The positive electrode additive represented by Formula 1 may be a compound represented by the following Formula 2:

[Formula 2]

wherein $R_1$, $R_2$, $R_3$, $R_4$, $R_5$, and $R_6$ are each independently selected from H, F, Cl, Br, OMe, or a substituted or unsubstituted $C_1$ to $C_4$ alkyl group and n is 0 or 1.

The positive electrode additive represented by Formula 1 may be a compound represented by the following Formula 3:

[Formula 3]

wherein $R_1$ to $R_7$ are each independently selected from H, F, Cl, Br, OMe, or a substituted or unsubstituted $C_1$ to $C_4$ alkyl group and n is 0 or 1.

The positive electrode additive may be included in the positive electrode in an amount of about 0.1 to about 5.0 wt %, based on a total weight of materials of the positive electrode.

The positive electrode active material may be a manganese-based positive electrode active material.

The positive electrode active material may include one or more active materials selected from the group of compounds represented by the following Formulae 4 to 17:

$LiMnA_2$ [Formula 4]

$Li_xMnA_2$ [Formula 5]

$LiMnO_{2-z}A_z$ [Formula 6]

$Li_xMnO_{2-z}A_z$ [Formula 7]

$LiMn_{1-y}M_yA_2$ [Formula 8]

$Li_xMn_{1-y}M_yA_2$ [Formula 9]

$LiMn_2A_4$ [Formula 10]

$Li_xMn_2O_4$ [Formula 11]

$LiMn_2O_{4-z}A_z$ [Formula 12]

$Li_xMn_2O_{4-z}A_z$ [Formula 13]

$LiMn_{2-y}M_yA_4$ [Formula 14]

$Li_xMn_{2-y}M_yA_4$ [Formula 15]

wherein, in Formulae 4 to 15, $1.0 \le x \le 1.2$, $0.01 \le y \le 0.1$, $0.01 \le z \le 0.5$, M includes at least one metal selected from the group of Al, Cr, Co, Mg, La, Ce, Sr, and V, and A is selected from the group of O, F, S and P, $Li_{1+x}Ni_yMn_{2-y-z}M_zO_2$ [Formula 16]

wherein, in Formula 16, $0 \le x < 0.2$, $0.4 \le y \le 0.6$, $0 \le z \le 0.2$, $0 \le w \le 0.1$, and M includes at least one selected from the group of Co, Al, Ti, Mg, and Zn, and $Li_{1+x}Ni_yMn_{2-y-z}M_zO_{4+w}$ [Formula 17]

wherein, in Formula 17, $0 \le x < 0.2$, $0.4 \le y \le 0.6$, $0 \le z \le 0.2$, $0 \le w \le 0.1$, and M includes at least one selected from the group of Al, Ti, Mg, and Zn.

The positive electrode active material may include a compound represented by the following Formula 17:

$Li_{1+x}Ni_yMn_{2-y-z}M_zO_{4+w}$ [Formula 17]

wherein $0 \le x < 0.2$, $0.4 \le y \le 0.6$, $0 \le z \le 0.2$, $0 \le w \le 0.1$, and M includes at least one selected from the group of Al, Ti, Mg, and Zn.

The embodiments may also be realized by providing a lithium rechargeable battery including a positive electrode; a negative electrode; a separator; and an electrolyte, wherein the positive electrode includes a positive electrode active material; a binder; and a positive electrode additive represented by the following Formula 1:

[Formula 1]

wherein R is a substituted or unsubstituted $C_1$ to $C_{10}$ alkyl group or a substituted or unsubstituted $C_5$ to $C_{30}$ aryl group and n is 0 or 1.

The positive electrode additive represented by Formula 1 may be a compound represented by the following Formula 2:

[Formula 2]

wherein $R_1$, $R_2$, $R_3$, $R_4$, $R_5$, and $R_6$ are each independently selected from H, F, Cl, Br, OMe, or a substituted or unsubstituted $C_1$ to $C_4$ alkyl group and n is 0 or 1.

The positive electrode additive represented by Formula 1 may be a compound represented by the following Formula 3:

[Formula 3]

wherein $R_1$ to $R_7$ are each independently selected from H, F, Cl, Br, OMe, or a substituted or unsubstituted $C_1$ to $C_4$ alkyl group and n is 0 or 1.

The positive electrode additive may be included in the positive electrode in an amount of about 0.1 to about 5.0 wt %, based on a total weight of materials of the positive electrode.

The positive electrode active material may be a manganese-based positive electrode active material.

The positive electrode active material may include one or more active materials selected from the group of compounds represented by the following Formulae 4 to 17:

| | |
|---|---|
| $LiMnA_2$ | [Formula 4] |
| $Li_xMnA_2$ | [Formula 5] |
| $LiMnO_{2-z}A_z$ | [Formula 6] |
| $Li_xMnO_{2-z}A_z$ | [Formula 7] |
| $LiMn_{1-y}M_yA_2$ | [Formula 8] |
| $Li_xMn_{1-y}M_yA_2$ | [Formula 9] |
| $LiMn_2A_4$ | [Formula 10] |
| $Li_xMn_2O_4$ | [Formula 11] |
| $LiMn_2O_{4-z}A_z$ | [Formula 12] |
| $Li_xMn_2O_{4-z}A_z$ | [Formula 13] |
| $LiMn_{2-y}M_yA_4$ | [Formula 14] |
| $Li_xMn_{2-y}M_yA_4$ | [Formula 15] | wherein, in Formulae 4 to 15, $1.0 \leq x \leq 1.2$, $0.01 \leq y \leq 0.1$, $0.01 \leq z \leq 0.5$, M includes at least one metal selected from the group of Al, Cr, Co, Mg, La, Ce, Sr, and V, and A is selected from the group of O, F, S and P, $$Li_{1+x}Ni_yMn_{1-y-z}M_zO_2 \quad [\text{Formula 16}]$$

wherein, in Formula 16, $0 \leq x < 0.2$, $0.4 \leq y \leq 0.6$, $0 \leq z \leq 0.2$, $0 \leq w \leq 0.1$, and M includes at least one selected from the group of Co, Al, Ti, Mg, and Zn, and $$Li_{1+x}Ni_yMn_{2-y-z}M_zO_{4+w} \quad [\text{Formula 17}]$$

wherein, in Formula 17, $0 \leq x < 0.2$, $0.4 \leq y \leq 0.6$, $0 \leq z \leq 0.2$, $0 \leq w \leq 0.1$, and M includes at least one selected from the group of Al, Ti, Mg, and Zn.

The positive electrode active material may include a compound represented by the following Formula 17:

$$Li_{1+x}Ni_yMn_{2-y-z}M_zO_{4+w} \quad [\text{Formula 17}]$$

wherein $0 \leq x < 0.2$, $0.4 \leq y \leq 0.6$, $0 \leq z \leq 0.2$, $0 \leq w \leq 0.1$, and M includes at least one selected from the group of Al, Ti, Mg, and Zn.

BRIEF DESCRIPTION OF THE DRAWINGS

Features will become apparent to those of ordinary skill in the art by describing in detail exemplary embodiments with reference to the attached drawings in which.

DETAILED DESCRIPTION

Korean Patent Application No. 10-2012-0001186, filed on Jan. 4, 2012, in the Korean Intellectual Property Office, and entitled: "Positive Electrode for Lithium Rechargeable Battery and Lithium Rechargeable Battery Comprising the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two element, it can be the only element between the two elements, or one or more intervening elements may also be present.

The embodiments provide a positive electrode for a lithium rechargeable battery. The positive electrode may include a positive electrode active material, a binder, and a positive electrode additive represented by the following Formula 1:

[Formula 1]

In Formula 1, R may be a substituted or unsubstituted $C_1$ to $C_{10}$ alkyl group or a substituted or unsubstituted $C_5$ to $C_{30}$ aryl group and n may be 0 or 1.

Figure 1:
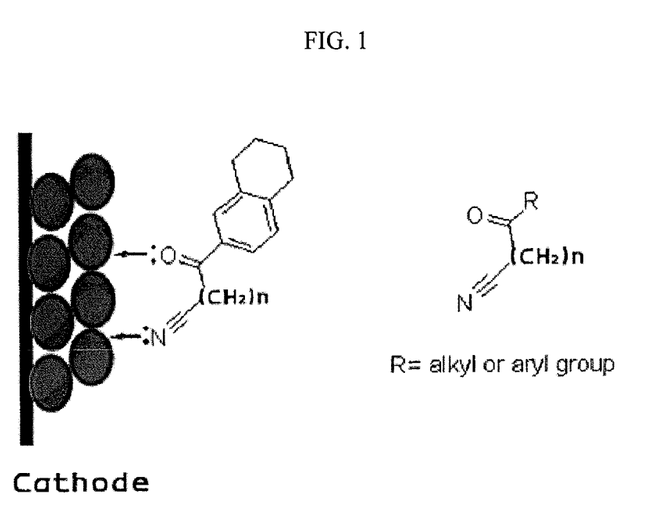
FIG. 1 schematically illustrates an operation of a positive electrode additive according to an embodiment.

As may be seen in Formula 1, the positive electrode additive may be a bifunctional compound including groups of —CN and C=O, e.g., the compound may include two functional groups, which may be bonded more strongly to a positive electrode surface (see FIG. 1). Thus, the bifunctional positive electrode additive may help prevent an electrolyte from being decomposed, thereby suppressing separation of Mn ions. For example, if a battery employing a 5 V level spinel active material is left to stand at high temperature, Mn ions may be eluted to be separated on the positive electrode surface, resulting in an increase of a positive electrode. The bifunctional positive electrode additive according to the embodiments may help improve high-temperature storage characteristics. In an implementation, any other suitable bifunctional compound may be included in the positive electrode additive.

In an implementation, the positive electrode additive represented by Formula 1 may include, e.g., acetyl cyanide or a compound represented by the following Formula 2 or Formula 3.

[Formula 2]

In Formula 2, $R_1$, $R_2$, $R_3$, $R_4$, $R_5$, and $R_6$ may each independently include H, F, Cl, Br, OMe or a substituted or unsubstituted $C_1$ to $C_4$ alkyl group and n may be 0 or 1. Herein, in the Formulae, OMe may represent a methoxy group.

For example, the positive electrode additive represented by Formula 2 may include α-oxo-benzeneacetonitrile and/or β-oxo-benzenepropanenitrile.

[Formula 3]

In Formula 3 $R_1$ to $R_7$ may each independently include H, F, Cl, Br, OMe or a substituted or unsubstituted $C_1$ to $C_4$ alkyl group and n may be 0 or 1.

For example, the positive electrode additive represented by Formula 3 may include 3-(1,2,3,4-tetrahydronaphthalen-6-yl)-3-oxopropanenitrile.

The positive electrode additive may be included in the positive electrode in an amount of about 0.1 to about 5.0 wt %, based on a total weight (e.g., 100% by weight) of materials of the positive electrode. Maintaining the amount of the positive electrode additive about 0.1 to about 5.0 wt % may help ensure that a relative high-temperature storage effect is achieved.

The embodiments also provide a lithium rechargeable battery. The lithium rechargeable battery may include a positive electrode according to an embodiment, a negative electrode, a separator, and an electrolyte.

<Positive Electrode>

The positive electrode may be fabricated by forming a slurry (prepared by mixing the positive electrode additive according to an embodiment, a positive electrode active material, a conductive agent, and a binder in a solvent), and coating the slurry on a positive electrode current collector, followed by drying and compressing. If desired, a filler or a viscosity controlling agent may further be added to the slurry.

The positive electrode current collector may be selected from the group of a metal such as aluminum, copper, nickel, silver, stainless steel, and alloys thereof. In an implementation, aluminum or an aluminum alloy may be used as the positive electrode current collector. The positive electrode current collector may have a thickness of about 3 to about 500 μm.

The positive electrode active material may include any suitable positive electrode active material for a secondary battery. For example, the positive electrode active material may include a Mn-based positive electrode active material.

The positive electrode active material may be inexpensive. Thus, the positive electrode active material may be used in a large amount. In an implementation, a lithium manganese based oxide having excellent high-temperature stability may be used. Non-limiting examples of the lithium manganese based oxide may include one or more active materials selected from the group of compounds represented by the following Formulae 4 to 17:

| | |
|---|---|
| $LiMnA_2$ | [Formula 4] |
| $Li_xMnA_2$ | [Formula 5] |
| $LiMnO_{2-z}A_z$ | [Formula 6] |
| $Li_xMnO_{2-z}A_z$ | [Formula 7] |
| $LiMn_{1-y}M_yA_2$ | [Formula 8] |
| $Li_xMn_{1-y}M_yA_2$ | [Formula 9] |
| $LiMn_2A_4$ | [Formula 10] |
| $Li_xMn_2O_4$ | [Formula 11] |
| $LiMn_2O_{4-z}A_z$ | [Formula 12] |
| $Li_xMn_2O_{4-z}A_z$ | [Formula 13] |
| $LiMn_{2-y}M_yA_4$ | [Formula 14] |
| $Li_xMn_{2-y}M_yA_4$ | [Formula 15] |

In Formulae 4 to 15, $1.0 \leq x \leq 1.2$, $0.01 \leq y \leq 0.1$, $0.01 \leq z \leq 0.5$. In an implementation, M may include at least one metal of a transition metal or a lanthanide metal. In an implementation, M may include at least one metal selected from the group of Al, Cr, Co, Mg, La, Ce, Sr, and V. A may be selected from the group of O, F, S, and P.

$$Li_{1+x}Ni_yMn_{1-y-z}M_zO_2 \quad \text{[Formula 16]}$$

In Formula 16, $0 \leq x < 0.2$, $0.4 \leq y \leq 0.6$, $0 \leq z \leq 0.2$, $0 \leq w \leq 0.1$. M may include at least one selected from the group of Co, Al, Ti, Mg, and Zn.

$$Li_{1+x}Ni_yMn_{2-y-z}M_zO_{4+w} \quad \text{[Formula 17]}$$

In Formula 17, $0 \leq x < 0.2$, $0.4 \leq y \leq 0.6$, $0 \leq z \leq 0.2$, $0 \leq w \leq 0.1$. M may include at least one selected from the group of Al, Ti, Mg, and Zn.

Non-limiting examples of the positive electrode active material according to an embodiment may include lithium transition metal composite oxides (e.g., a lithium manganese composite oxide such as $LiMn_2O_4$, oxides with manganese partially replaced with another transition metal, etc.) and chalcogen compounds (e.g., manganese dioxide, etc.). In an implementation, the positive electrode active material may include $LiMnO_2$, $LiMn_2O_4$, $Li(Ni_aCo_bMn_c)O_2$ where $0<a<1$, $0<b<1$, $0<c<1$, and $a+b+c=1$, $LiCo_{1-Y}Mn_YO_2$, $LiNi_{1-Y}Mn_YO_2$ where $0 \leq Y < 1$, $Li(Ni_aCo_bMn_c)O_4$ where $0<a<2$, $0<b<2$, $0<c<2$, and $a+b+c=2$, $LiMn_{2-Z}Ni_ZO_4$, $LiMn_{2-Z}Co_ZO_4$ where $0<Z<2$, and combinations thereof.

According to an embodiment, the positive electrode active material may include, e.g., $Li_{1+a}Mn_{2-a}O_4$ where $a=0$ to 0.33, $LiMnO_3$, $LiMn_2O_3$, $LiMnO_2$, $LiMn_{2-a}M_aO_2$ where M=Co, Ni, Fe, Cr, Zn, or Ta, and $a=0.01$ to 0.1, $Li_2Mn_3MO_8$ where M=Fe, Co, Ni, Cu, or Zn, and $LiMn_2O_4$ where Li is partially replaced with alkali-earth metal ions, which can be used alone or in combinations of two or more of these materials.

In an implementation, the compound represented by Formula 17 may be used as the positive electrode active material.

$$Li_{1+x}Ni_yMn_{2-y-z}M_zO_{4+w} \quad \text{[Formula 17]}$$

In Formula 17, $0 \leq x < 0.2$, $0.4 \leq y \leq 0.6$, $0 \leq z \leq 0.2$, $0 \leq w \leq 0.1$. M may include at least one selected from the group of Al, Ti, Mg, and Zn.

The positive electrode active material may include a coating layer formed on a surface of the compound.

The solvent may include a nonaqueous solvent or an aqueous solvent. Examples of the nonaqueous solvent may include N-methylpyrrolidone (NMP), dimethylformamide, dimethylacetamide, N,N-dimethylaminopropylamine, ethylene oxide, tetrahydrofuran, and the like.

Any suitable material that is capable of binding particles of a positive electrode active material to one another and binding the positive electrode active material to a current collector, may be used as the binder. Examples of the binder may include polyvinyl alcohol, carboxymethyl cellulose, hydroxypropylene cellulose, polyvinyl chloride, carboxylated polyvinyl chloride, polyvinyl fluoride, ethylene oxide containing polymers, polyvinyl pyrrolidone, polyvinyl urethane, polytetrafluoroethylene, polyvinylidene fluoride, polyethylene, polypropylene, styrene-butadiene rubber, acrylated styrene-butadiene rubber, epoxy resin, and nylon. In an implementation, polyvinylidene fluoride may be used as the binder.

The conductive agent may enhance electrical conductivity of an electrode. Any suitable electrically conductive material that does not cause a chemical change in the fabricated battery may be used as a conductive agent. The conductive agent may be included in an amount of about 1 to about 30 wt %, based on a total weight (e.g., 100% by weight) of the electrode slurry. Examples of the conductive agent may include a carbonaceous material such as natural graphite, artificial graphite, carbon black, acetylene black, ketjen black, or a carbon fiber, a metallic material such as a metal powder or a metal fiber including copper, nickel, aluminum, and silver, a conductive material including a conductive polymer such as a polyphenylene derivative, or mixtures thereof, and the like.

The filler may be an adjunctive component that helps to suppress an electrode from swelling. Any suitable, e.g., fibrous, material that does not cause a chemical change in the fabricated battery may be used. Examples of the filler may include an olefin-based polymer such as polyethylene or polypropylene, a fibrous material such as glass fiber or carbon fiber, and the like.

The viscosity controlling agent may help control a viscosity of an electrode composite to facilitate mixing of the electrode composite and coating of the electrode composite on a current collector. The viscosity controlling agent may be included in an amount of about 30 wt % or less, based on a total weight (e.g., 100% by weight) of the electrode composite. Examples of the viscosity controlling agent may include carboxymethyl cellulose, polyvinylidene fluoride, and the like. In an implementation, the solvent used in preparing a positive electrode slurry may serve as a viscosity controlling agent.

<Negative Electrode>

The negative electrode may include a negative electrode active material capable of intercalating or deintercalating lithium ions. The negative electrode may be fabricated by forming a slurry composition (formed by dispersing a negative electrode active material, a binder, and a conductive agent in a solvent), and coating the slurry composition on a negative electrode current collector.

The negative electrode active material may include one or combinations of two or more materials selected from a material capable of irreversibly intercalating and deintercalating lithium ions, a metallic material capable of forming an alloy with lithium, and mixtures thereof. Examples of the material capable of irreversibly intercalating and deintercalating lithium ions may include at least one selected from the group of natural graphite, artificial graphite, graphitized carbon fiber, graphitized mesocarbon microbeads, fullerene, and amorphous carbon. Examples of the amorphous carbon may include hard carbon, cokes, MCMB sintered at 1,500° C. or less, MPCF, and the like. Examples of the metallic material capable of forming an alloy with lithium may include at least one selected from the group of Al, Si, Sn, Pb, Zn, Bi, In, Mg, Ga, Cd, and Ge. The metallic material may be used alone or in combinations or alloys. In an implementation, the metallic material may be used as a composite material with a carbonaceous material mixed therewith.

The negative electrode plate may be fabricated by coating a negative electrode slurry (obtained by mixing and dispersing the negative electrode composite in a solvent) on a negative electrode current collector, drying, and compressing.

The negative electrode current collector may include a punched metal, an expanded punched metal, a gold foil, a foamed metal, a reticulated sintered metal fiber, a nickel foil, a copper foil, and the like.

The same materials as those of the positive electrode active material slurry, described above, may be used as the solvent, the binder, and the conductive agent, respectively.

<Separator>

The lithium rechargeable battery may include a separator to prevent an electrical short circuit between the positive electrode and the negative electrode and to provide a movement passage for lithium ions. Examples of the separator may include a polyolefin-based polymer film or a multi-layered film, such as polypropylene, polyethylene, polyethylene/polypropylene, polyethylene/polypropylene/polyethylene, polypropylene/polyethylene/polypropylene, a microporous film, a woven fabric, a nonwoven fabric, and the like. In an implementation, a film having a resin having excellent stability or a ceramic material coated on a porous polyolefin film may also be used as the separator. When a solid electrolyte, e.g., a polymer, is used as an electrolyte, it may also serve as the separator.

The separator may be interposed between the positive electrode and the negative electrode and may be formed of a thin film having high ionic transmissivity and a high mechanical strength. The separator may have a pore diameter of about 0.01 to about 10 μm and a thickness of about 5 to about 300 μm.

<Electrolyte>

The electrolyte may include a lithium salt and a nonaqueous organic solvent. In order to help improve charging/discharging characteristics and to help reduce and/or prevent an over-charge, the electrolyte may further include additives. The lithium salt may act as a source of lithium ions in the battery to facilitate operation thereof. The nonaqueous organic solvent may act as a medium for transmitting ions taking part in the electrochemical reaction of the battery.

Examples of the lithium salt may include one selected from the group of $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_4$, $LiAlCl_4$, $LiCl$, and $LiI$, and combinations of two or more of these materials. The lithium salt may be included at a concentration of about 0.6 to about 2.0 M, e.g., about 0.7 to about 1.6 M. Maintaining the concentration of the lithium salt at about 0.6 M or greater may help reduce and/or prevent a degradation in electrolyte performance (which may be caused by low electrolyte conductivity). Maintaining the lithium salt concentration at about 2.0 M or less may help reduce and/or prevent a reduction in lithium ion mobility (which may be caused by an increase of electrolyte viscosity).

The nonaqueous organic solvent may include a carbonate-based, an ester-based, an ether-based, or a ketone-based solvent and may be used alone or in combination. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butyrene carbonate (BC), and the like. Examples of the ester-based solvent may include γ-butyrolactone (GBL), n-methyl acetate, n-ethyl acetate, n-propyl acetate, and the like. An example of the ether-based solvent may include dibutyl ether. However, the embodiments are not limited thereto.

The nonaqueous organic solvent may further include an aromatic hydrocarbon-based solvent. Examples of the aromatic hydrocarbon-based solvent may include benzene, fluorobenzene, bromobenzene, chlorobenzene, cyclohexylbenzene, isopropylbenzene, n-butylbenzene, octylbenzene, toluene, xylene, mesitylene, and the like, and may be used alone or in combinations.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Example 1

$LiNi_{0.5}Mn_{1.5}O_4$ having a particle size of 10 μm as a positive electrode active material, a carbon-based conductive agent, and polyvinylidene fluoride (PVDF) as a binder were mixed in a weight ratio of 94:3:3 in an N-methylpyrrolidone (NMP) solvent. 0.1 wt % of an additive represented by the following Formula 18 (Additive 5) was added thereto to prepare a positive active material slurry. The positive active material slurry was cast on an aluminum thin film, dried in a vacuum oven at 120° C., and compressed to fabricate a positive electrode. A 2016 coin type battery was fabricated using a graphite (KPT) negative electrode plate, an electrolyte (1.15 M $LiPF_6$ dissolved in EC/EMC=3/7), and a 18 μm-thick separator (Asahi A1).

[Formula 18]

Example 2

A lithium rechargeable battery was fabricated in the same manner as in Example 1 except that 1 wt % of the additive represented by Formula 18 was added in forming the positive electrode slurry.

Example 3

A lithium rechargeable battery was fabricated in the same manner as in Example 1 except that 2.0 wt % of the additive represented by Formula 18 was added in forming the positive electrode slurry.

Example 4

A lithium rechargeable battery was fabricated in the same manner as in Example 1 except that 1.0 wt % of an additive represented by Formula 19 (Additive 6) was added in forming the positive electrode slurry.

[Formula 19]

Example 5

A lithium rechargeable battery was fabricated in the same manner as in Example 1 except that 1.0 wt % of an additive represented by Formula 20 (Additive 7) was added in forming the positive electrode slurry.

Example 6

A lithium rechargeable battery was fabricated in the same manner as in Example 1 except that 1.0 wt % of an additive represented by Formula 21 (Additive 8) was added in forming the positive electrode slurry.

Example 7

A lithium rechargeable battery was fabricated in the same manner as in Example 1 except that 8 wt % of the additive represented by Formula 18 was added in forming the positive electrode slurry.

Example 8

A lithium rechargeable battery was fabricated in the same manner as in Example 1 except that 0.05 wt % of the additive represented by Formula 18 was added in forming the positive electrode slurry.

Comparative Example 1

A lithium rechargeable battery was fabricated in the same manner as in Example 1 except that no positive electrode additive was added in forming the positive electrode slurry.

Experimental Example

Evaluation of Battery Performance

The coin type battery cells fabricated in the Examples and Comparative Example were tested while charging and discharging. First, each of the battery cells was charged and discharged twice at 0.1 C/0.1 C during a formation process, and then charged and discharged once at 0.2 C/0.2 C during a standard process until the charge reached 4.8 V (Li/graphite) and a discharge voltage reached 3.0 V (Li/graphite).

Figure 2:
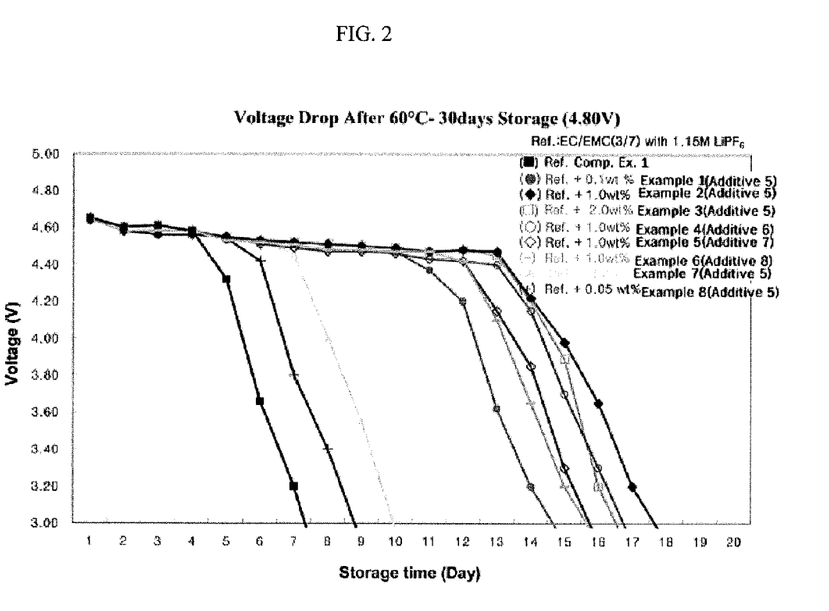
FIG. 2 illustrates a graph of results of high-temperature storage of batteries fabricated in the Examples and Comparative Examples at 60° C.

Each battery cell was charged with a charge current of 0.5 C for storage at a high temperature of 60° C. and then placed in a constant temperature chamber maintained at 60° C. Then, the OCV of each battery cell was measured, and the measurement results are shown in FIG. 2. The OCV was measured using a Hioki 3555 Battery HiTester after the cell was stored at 60° C., taken out of the constant temperature chamber maintained at 60° C. at intervals of 24 hours, and left to stand undisturbed for 2 minutes.

<Evaluation Results of Battery Performance>

Referring to FIG. 2, performance evaluation tests were conducted on the battery cells fabricated in the Examples and Comparative Example after storage at a high temperature of 60° C. As may be seen in the evaluation results, each of the battery cells fabricated in Examples 1-6 included the positive electrode additive according to an embodiment (including —CN and C═O groups), which may suppress electrolyte decomposition. Thus, a voltage (OCV) drop to 3 V was demonstrated after a storage period of 15-18 days. However, the battery cell fabricated in the Comparative Example (in which no positive electrode additive was used) demonstrated a voltage drop to 3 V after a storage period of only 7 days.

By way of summation and review, in view of energy density, it may be difficult to achieve high-voltage energy using $LiCoO_2$ as an active material. Therefore, research into new active materials as a substitute for $LiCoO_2$ has been considered. For example, a Mn-based lithium oxide has been considered.

When a cell using a positive electrode active material having a spinel structure is left to stand at a high temperature in a fully charged state, an electrolyte using a conventional $LiPF_6$ lithium salt may decompose to generate HF, resulting in elution of metal ions. In addition, separation of the eluted metal ions on a negative electrode surface may increase a negative electrode potential and may reduce an open-circuit voltage (OCV) of the cell, thereby deteriorating cycle performance and high-temperature storage characteristic.

The embodiments provide a positive electrode for a lithium rechargeable battery, which helps prevent a decrease in open circuit voltage (OCV) during high-voltage charging and high-temperature long-period storage by reducing separation of metal ions from a positive electrode surface by reducing elution of metal ions at a high temperature and forming a coating on the positive electrode surface.

According to one or more of the embodiments, a high-temperature characteristic of a battery system may be improved by suppressing electrolyte decomposition caused by an interface reaction between a positive electrode active material surface and an electrolyte by adding an additive to the positive electrode.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A positive electrode for a lithium rechargeable battery, the positive electrode comprising:
   a positive electrode active material;
   a binder; and
   a positive electrode additive represented by the following Formula 1:

wherein R includes a $C_1$ to $C_{10}$ alkyl group or a $C_5$ to $C_{30}$ aryl group and n is 0 or 1 and wherein the positive electrode additive is included in the positive electrode in an amount of about 0.1 to about 5.0 wt %, based on a total weight of materials of the positive electrode.

2. The positive electrode as claimed in claim 1, wherein the positive electrode additive represented by Formula 1 is a compound represented by the following Formula 2:

[Formula 2]

wherein $R_1$, $R_2$, $R_3$, $R_4$, $R_5$, and $R_6$ each independently include H, F, Cl, Br, OMe, or a $C_1$ to $C_4$ alkyl group and n is 0 or 1.

3. The positive electrode as claimed in claim 1, wherein the positive electrode additive represented by Formula 1 is a compound represented by the following Formula 3:

[Formula 3]

wherein $R_1$ to $R_7$ each independently include H, F, Cl, Br, OMe, or a $C_1$ to $C_4$ alkyl group and n is 0 or 1.

4. The positive electrode as claimed in claim 1, wherein the positive electrode active material is a manganese-based positive electrode active material.

5. The positive electrode as claimed in claim 1, wherein the positive electrode active material includes a compound represented by one of the following Formulae 4 to 17:

$LiMnA_2$ [Formula 4]

$Li_xMnA_2$ [Formula 5]

$LiMnO_{2-z}A_z$ [Formula 6]

$Li_xMnO_{2-z}A_z$ [Formula 7]

$LiMn_{1-y}M_yA_2$ [Formula 8]

$Li_xMn_{1-y}M_yA_2$ [Formula 9]

$LiMn_2A_4$ [Formula 10]

$Li_xMn_2O_4$ [Formula 11]

$LiMn_2O_{4-z}A_z$ [Formula 12]

$Li_xMn_2O_{4-z}A_z$ [Formula 13]

$LiMn_{2-y}M_yA_4$ [Formula 14]

$Li_xMn_{2-y}M_yA_4$ [Formula 15]

wherein, in Formulae 4 to 15, $1.0 \leq x \leq 1.2$, $0.01 \leq y \leq 0.1$, $0.01 \leq z \leq 0.5$, M includes Al, Cr, Co, Mg, La, Ce, Sr, or V, and A is O, F, S or P, $Li_{1+x}Ni_yMn_{1-y-z}M_zO_2$ [Formula 16]

wherein, in Formula 16, $0 \leq x \leq 0.2$, $0.4 \leq y \leq 0.6$, $0 \leq z \leq 0.2$, and M includes Co, Al, Ti, Mg, or Zn, and $Li_{1+x}Ni_yMn_{2-y-z}M_zO_{4+w}$ [Formula 17]

wherein, in Formula 17, $0 \leq x \leq 0.2$, $0.4 \leq y \leq 0.6$, $0 \leq z \leq 0.2$, $0 \leq w \leq 0.1$, and M includes Al, Ti, Mg, or Zn.

6. The positive electrode as claimed in claim 1, wherein the positive electrode active material includes a compound represented by the following Formula 17:

$Li_{1+x}Ni_yMn_{2-y-z}M_zO_{4+w}$ [Formula 17]

wherein $0 \leq x \leq 0.2$, $0.4 \leq y \leq 0.6$, $0 \leq z \leq 0.2$, $0 \leq w \leq 0.1$, and M includes Al, Ti, Mg, or Zn.

7. A lithium rechargeable battery, comprising:
a positive electrode;
a negative electrode;
a separator; and
an electrolyte,
wherein the positive electrode includes:
a positive electrode active material;
a binder; and
a positive electrode additive represented by the following Formula 1:

[Formula 1]

wherein R includes a $C_1$ to $C_{10}$ alkyl group or a $C_5$ to $C_{30}$ aryl group and and n is 0 or 1 and wherein the positive electrode additive is included in the positive electrode in an amount of about 0.1 to about 5.0 wt %, based on a total weight of materials of the positive electrode.

8. The lithium rechargeable battery as claimed in claim 7, wherein the positive electrode additive represented by Formula 1 is a compound represented by the following Formula 2:

[Formula 2]

wherein $R_1$, $R_2$, $R_3$, $R_4$, $R_5$ and $R_6$ each independently include H, F, Cl, Br, OMe, or a $C_1$ to $C_4$ alkyl group and n is 0 or 1.

9. The lithium rechargeable battery as claimed in claim 7, wherein the positive electrode additive represented by Formula 1 is a compound represented by the following Formula 3:

[Formula 3]

wherein $R_1$ to $R_7$ each independently include H, F, Cl, Br, OMe, or a $C_1$ to $C_4$ alkyl group and n is 0 or 1.

10. The lithium rechargeable battery as claimed in claim 7, wherein the positive electrode active material is a manganese-based positive electrode active material.

11. The lithium rechargeable battery as claimed in claim 7, wherein the positive electrode active material includes a compound represented by one of the following Formulae 4 to 17:

$$LiMnA_2 \quad [\text{Formula 4}]$$

$$Li_xMnA_2 \quad [\text{Formula 5}]$$

$$LiMnO_{2-z}A_z \quad [\text{Formula 6}]$$

$$Li_xMnO_{2-z}A_z \quad [\text{Formula 7}]$$

$$LiMn_{1-y}M_yA_2 \quad [\text{Formula 8}]$$

$$Li_xMn_{1-y}M_yA_2 \quad [\text{Formula 9}]$$

$$LiMn_2A_4 \quad [\text{Formula 10}]$$

$$Li_xMn_2O_4 \quad [\text{Formula 11}]$$

$$LiMn_2O_{4-z}A_z \quad [\text{Formula 12}]$$

$$Li_xMn_2O_{4-z}A_z \quad [\text{Formula 13}]$$

$$LiMn_{2-y}M_yA_4 \quad [\text{Formula 14}]$$

$$Li_xMn_{2-y}M_yA_4 \quad [\text{Formula 15}]$$

wherein, in Formulae 4 to 15, $1.0 \leq x \leq 1.2$, $0.01 \leq y \leq 0.1$, $0.01 \leq z \leq 0.5$, M includes Al, Cr, Co, Mg, La, Ce, Sr, or V, and A is O, F, S or P, $$Li_{1+x}Ni_yMn_{1-y-z}M_zO_2 \quad [\text{Formula 16}]$$

wherein, in Formula 16, $0 \leq x \leq 0.2$, $0.4 \leq y \leq 0.6$, $0 \leq z \leq 0.2$, and M includes Co, Al, Ti, Mg, or Zn, and $$Li_{1+x}Ni_yMn_{2-y-z}M_zO_{4+w} \quad [\text{Formula 17}]$$

wherein, in Formula 17, $0 \leq x \leq 0.2$, $0.4 \leq y \leq 0.6$, $0 \leq z \leq 0.2$, $0 \leq w \leq 0.1$, and M includes Al, Ti, Mg, or Zn.

12. The lithium rechargeable battery as claimed in claim 7, wherein the positive electrode active material includes a compound represented by the following Formula 17:

$$Li_{1+x}Ni_yMn_{2-y-z}M_zO_{4+w} \quad [\text{Formula 17}]$$

wherein $0 \leq x \leq 0.2$, $0.4 \leq y \leq 0.6$, $0 \leq z \leq 0.2$, $0 \leq w \leq 0.1$, and M includes Al, Ti, Mg, or Zn.

* * * * *